(12) United States Patent
Bouzid et al.

(10) Patent No.: US 10,447,854 B2
(45) Date of Patent: *Oct. 15, 2019

(54) ANSWERING MACHINE DETECTION (71) Applicant: GENESYS TELECOMMUNICATIONS LABORATORIES, INC., Daly City, CA (US)

(72) Inventors: Ahmed Tewfik Bouzid, McLean, VA (US); Prakash Bhagwan Durgani, Sterling, VA (US); Lei Huang, Hangzhou (CN); Charles Qichi Lu, Omaha, NE (US); Rong Ma, Hangzhou (CN); Vadim Snitkovsky, Rockville, MD (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/438,593

(22) Filed: Feb. 21, 2017

(65) Prior Publication Data

US 2017/0163804 A1    Jun. 8, 2017

Related U.S. Application Data

(63) Continuation of application No. 14/817,127, filed on Aug. 3, 2015, now Pat. No. 9,578,170, which is a (Continued)

(51) Int. Cl.
*H04M 3/00* (2006.01)
*H04M 3/51* (2006.01)
(Continued)

(52) U.S. Cl.
CPC .......... *H04M 3/5158* (2013.01); *G10L 25/51* (2013.01); *G10L 25/78* (2013.01);
(Continued)

(58) Field of Classification Search
CPC ....... H04M 3/5158; H04M 2203/2027; H04M 3/5175; H04M 3/5183; H04M 2203/2016;
(Continued)

(56) References Cited

U.S. PATENT DOCUMENTS 5,371,787 A * 12/1994 Hamilton .............. H04M 1/654
  379/216.01
5,430,792 A *  7/1995 Jesurum ................. H04M 3/46
  379/265.02

(Continued)

OTHER PUBLICATIONS

International Search Report and Written Opinion for Application No. PCT/US2012/028765, dated Jun. 29, 2012, 8 pages.

*Primary Examiner* — Ahmad F. Matar
*Assistant Examiner* — Kharye Pope (57) ABSTRACT

A call is placed to a communications device. A response to the call is received from a call recipient associated with the communications device. The received response is processed based on a set of parameters. Based on processing the received response, a determination is made whether the call recipient is a human or an answering machine. If the call recipient is determined to be a human, the call is handled in a first manner. If the call recipient is determined to be an answering machine, the call is handled in a second manner that is different from the first manner.

22 Claims, 6 Drawing Sheets

Related U.S. Application Data continuation of application No. 13/417,970, filed on Mar. 12, 2012, now Pat. No. 9,100,479.

(60) Provisional application No. 61/451,589, filed on Mar. 10, 2011.

(51) Int. Cl.
   *H04M 3/533* (2006.01)
   *H04M 3/42* (2006.01)
   *G10L 25/51* (2013.01)
   *G10L 25/78* (2013.01)
   *H04L 12/66* (2006.01)

(52) U.S. Cl.
   CPC ....... *H04M 3/42161* (2013.01); *H04M 3/533* (2013.01); *H04M 2201/40* (2013.01); *H04M 2203/2027* (2013.01); *H04M 2242/18* (2013.01)

(58) Field of Classification Search
   CPC .. H04M 7/006; H04M 3/51; H04M 2203/407; G06F 3/0482
   USPC ................ 379/266.07, 266.08, 201.1, 88.01; 370/352, 353, 354, 355, 356, 357
   See application file for complete search history.

(56) References Cited

U.S. PATENT DOCUMENTS

| | | | |
|---|---|---|---|
| 5,457,732 A * | 10/1995 | Goldberg | H04W 88/185 340/7.23 |
| 5,724,420 A * | 3/1998 | Torgrim | H04M 3/5158 379/265.07 |
| 6,041,116 A * | 3/2000 | Meyers | H04M 3/5158 379/134 |
| 6,208,970 B1 * | 3/2001 | Ramanan | G10L 17/26 379/88.19 |
| 6,263,051 B1 | 7/2001 | Saylor et al. | |
| 6,587,547 B1 | 7/2003 | Zirngibl et al. | |
| 6,744,881 B1 | 6/2004 | Price | |
| 6,765,997 B1 | 7/2004 | Zirngibl et al. | |
| 6,850,602 B1 * | 2/2005 | Chou | H04M 3/5158 379/80 |
| 6,977,992 B2 | 12/2005 | Zirngibl et al. | |
| 6,990,179 B2 | 1/2006 | Merrow et al. | |
| 7,054,419 B2 | 5/2006 | Culliss | |
| 7,715,531 B1 | 5/2010 | Golding et al. | |
| 8,094,788 B1 * | 1/2012 | Eberle | G06Q 10/10 379/88.12 |
| 8,681,952 B2 | 3/2014 | Agarwal et al. | |
| 9,100,479 B2 | 8/2015 | Bouzid et al. | |
| 2002/0085686 A1 * | 7/2002 | Cullis | H04M 3/533 379/67.1 |
| 2003/0081737 A1 * | 5/2003 | DeGeorge | H04M 1/651 379/67.1 |
| 2003/0142809 A1 | 7/2003 | Coffey | |
| 2004/0037397 A1 * | 2/2004 | Roby | H04M 3/5158 379/88.01 |
| 2006/0104433 A1 | 5/2006 | Simpson et al. | |
| 2007/0116208 A1 * | 5/2007 | Williams | H04M 3/493 379/90.01 |
| 2007/0172050 A1 | 7/2007 | Weinstein et al. | |
| 2007/0223668 A1 | 9/2007 | Blumenfeld et al. | |
| 2008/0015846 A1 * | 1/2008 | Acero | G10L 15/22 704/201 |
| 2009/0128861 A1 * | 5/2009 | Toscano | H04M 3/53 358/400 |
| 2010/0172488 A1 * | 7/2010 | Segall | H04M 3/42365 379/266.07 |
| 2011/0116618 A1 | 5/2011 | Zyarko et al. | |
| 2011/0150208 A1 | 6/2011 | Stearns | |
| 2011/0182283 A1 * | 7/2011 | Van Buren | H04M 3/4936 370/352 |
| 2015/0341495 A1 | 11/2015 | Bouzid et al. | |

\* cited by examiner

ANSWERING MACHINE DETECTION

CROSS-REFERENCE TO RELATED APPLICATIONS

This application is a continuation of U.S. patent application Ser. No. 14/817,127, filed on Aug. 3, 2015, now U.S. Pat. No. 9,578,170, which is a continuation of U.S. patent application Ser. No. 13/417,970, filed on Mar. 12, 2012, now U.S. Pat. No. 9,100,479, which claims the benefit of, and priority to U.S. Provisional Application No. 61/451,589, filed Mar. 10, 2011, the contents of all of which are incorporated herein by reference in their entireties.

TECHNICAL FIELD

The present document relates generally to answering machine detection during outbound voice calls.

BACKGROUND

Some voice solutions service providers offer outbound calling services to their clients. In outbound calling services, calls are placed connecting a client voice site to call recipients. In some cases, the call recipient may be human. In other cases, the call recipient may be a machine, e.g., an answering machine.

SUMMARY

The present disclosure describes systems and techniques by which a voice service may determine whether the call recipient answering an outbound call is human or an answering machine. In one implementation, a voice solutions service provider manages a call center and provides a suite of services to clients of the service provider. One such service is an outbound calling service that enables the deployment of solutions, using a call platform at the data center, that trigger calls out to voice communications devices (e.g., telephones). The call platform connects a call recipient to a voice service (e.g., a voice site) hosted or otherwise provided by the call center when the call recipient picks up the phone and the call is established.

The call platform includes Answering Machine Detection (AMD) modules that perform the initial task of determining whether a human or a machine answered the outbound call. Based on a determination by the AMD whether a human or a machine answered the outbound call, the call flow may follow different paths executed by the call platform (e.g., the call may be connected to a human agent at the call center if the call recipient is determined to be a human, and an automated message may be played for recording by an answering machine if the call recipient is determined to be an answering machine).

In general, one aspect of the subject matter described in this specification may be embodied in a method that includes placing a call to a communications device. A response to the call is received from a call recipient associated with the communications device. The received response is processed based on a set of parameters. Based on processing the received response a determination is made whether the call recipient is a human or an answering machine. If the call recipient is determined to be a human, the call is handled in a first manner. If the call recipient is determined to be an answering machine, the call is handled in a second manner that is different from the first manner.

Particular implementations of this aspect may optionally include one or more of the following features. The set of parameters may include a maximum time out parameter that indicates a maximum time allowed for processing the received response before a determination is made that the call recipient is an answering machine. Making the determination whether the call recipient is a human or an answering machine may comprise determining that the call recipient is an answering machine conditioned on the processing of the received response failing to result in a determination that the call recipient is a human or an answering machine prior to lapse of a time interval equal to the maximum time allowed. The set of parameters may include a touch tone parameter that indicates that detection of a dual-tone multi-frequency (DTMF) tone in the received response results in determining that the call recipient is an answering machine. Making the determination whether the call recipient is a human or an answering machine may comprise determining that the call recipient is an answering machine conditioned on detection of a DTMF tone in the received response, based on the touch tone parameter being selected.

The set of parameters may include a noise parameter that indicates that a detection of background noise in the received response within a time window subsequent to call pickup and prior to initial detection of speech results in determining that the call recipient is a human. Making the determination whether the call recipient is a human or an answering machine may comprise determining that the call recipient is a human conditioned on the detection of the background noise within the time window, based on the noise parameter being selected.

The set of parameters may include a silence parameter that indicates that, subsequent to speech being initially detected in the received response, detection of a silence in the received response having a duration longer than a predetermined threshold results in determining that the call recipient is a human. Making the determination whether the call recipient is a human or an answering machine may comprise determining that the call recipient is a human conditioned on detecting the silence in the received response subsequent to the initial detection of speech in the received response, based on the silence parameter being selected.

The set of parameters may include a beep time out parameter that indicates a maximum window of time during which monitoring the received response for an audio beep sound will occur and during which time no message will be sent to the call recipient, the maximum window of time beginning after detecting a last spoken word in the received response and ending a predetermined time later. Making the determination whether the call recipient is a human or an answering machine may comprise determining that the call recipient is an answering machine conditioned on detecting a an audio beep in the received response at a time subsequent to the detected last spoken word but prior to the predetermined time, based on the beep time out parameter being selected.

The set of parameters may include a word count parameter that indicates that spoken words in the received response will be counted and that, if a number of spoken words exceeds a predetermined threshold, a determination will be made that the call recipient is an answering machine. Making the determination whether the call recipient is a human or an answering machine may comprise determining that the call recipient is an answering machine conditioned on the number of spoken words exceeding the predetermined threshold, based on the word count parameter being selected.

The set of parameters may include a no speech parameter that indicates that, subsequent to the call being answered, detection of no speech in the received response having a duration longer than a predetermined threshold results in determining that the call recipient is an answering machine. Making the determination whether the call recipient is a human or an answering machine may comprise determining that the call recipient is an answering machine conditioned on detecting no speech in the received response subsequent to the call being picked up, based on the no speech parameter being selected.

At least one parameter included in the set of parameters may be configurable by a user associated with placing the call to the communications device. The user may be enabled to configure the at least one parameter using a web-enabled interface.

Other embodiments of this aspect include corresponding systems and computer program products. The system includes a call recipient associated with a communications device. In addition, the system includes one or more processors and instructions embedded in non-transitory machine-readable media for execution by the one or more processors. The instructions are configured to cause the one or more processors to interact with the call recipient associated with the communications device for performing the above listed actions.

The computer program product is embodied in a non-transitory computer-readable medium storing software that comprises instructions executable by one or more computers. The instructions, upon execution by the by one or more computers, cause the one or more computers to perform the above listed actions.

The improved AMD techniques may provide increased accuracy and speed, thereby enabling the outbound calls to be configured to be more callee-friendly and providing a human call recipient with an improved calling experience. A client associated with a voice service may benefit from an easy customization of parameters for configuring the AMD module used by the voice service.

The details of one or more disclosed implementations are set forth in the accompanying drawings and the description below.

DETAILED DESCRIPTION

A call center may provide to one or more clients a voice service that includes outbound calling services, in which a call platform implemented by the call center places outbound calls to voice communications devices such as telephones.

When an outbound call is answered, it may be important to determine whether the call was picked up by a human being or an answering machine/voice mail. Depending on whether a human or a machine answered the call, the call flow may follow different paths. The initial task of determining whether the call recipient is a human or a machine may be performed by answering machine detection (AMD) modules included in the call platform. In some implementations, each voice service hosted by the call center may be configured with its own AMD module. The call center may enable a client to customize the AMD module associated with the client's voice site/service.

In some implementations, the outbound calling services may be used by voice sites hosted by the call center and associated with the clients of the call center. In this context, a voice site may be a set of scripts or, more generally, programming language modules corresponding to one or more linked pages that collectively interoperate to produce an automated interactive experience with a user, e.g., the recipient of the outbound call. A voice site may include scripts or programming language modules corresponding to at least one voice page, which is a programming segment akin to a web page in both its modularity and its interconnection to other pages, but specifically directed to audio interactions.

The voice site may be configured to handle outbound voice calls made to voice communications devices. The voice site may be an automated interactive voice site that is configured to process, using pre-programmed scripts, information received from a call recipient in answer to an outbound call, and in response manage the call flow.

The interaction between the call recipient and the voice site may be done using an interactive voice response system (IVR) provided by the call center. In some implementations, the IVR may be implemented by the call platform and may be configured to execute the AMD module, created and customized for the voice site, while providing support for the outbound calls.

The determination by a typical AMD module whether a person or a machine has answered an outbound call may take several seconds to complete after the phone has been picked up. Dead air is typically played during these several seconds, which may present usability problems in cases where the recipient of the call is a human. For example, the human call recipient may terminate the call upon hearing the several seconds of silence from the caller.

A typical AMD module also may suffer from a high error rate in determining whether an outbound call was answered by an answering machine or by a human. This incorrect determination may trigger a wrong sequence of call handling actions. For example, some call handling instructions may result in the call being transferred to an agent upon determining that the call recipient is human. When the AMD module incorrectly designates a call as being answered by a human rather than an answering machine, the call center agent receiving the transferred call may get connected to the answering machine, resulting in the call center agent hearing either dead air or dead air followed by a beep.

Moreover, even when the call handling instructions only result in the communication of a recorded voice message, an incorrect determination by the AMD module may still create problems. For example, a human typically greets a caller with a relatively short salutation (e.g., "hello") while answering machines tend to have longer greetings (e.g., "You have reached the Smith residence. We are not able to answer the phone right now, but if you leave your name and number after the beep, we will get back to you as soon as we can.") Due to this difference, it is desirable for outbound calls that are meant to communicate a recorded message to change their message delay based on a proper determination of whether the entity that answered the call is a human or an answering machine, with the message delay being longer (either by a fixed amount or by actively attempting to detect a "beep") for an answering machine than for a human. An incorrect identification by the AMD module may result in a truncated voicemail when an answering machine is incorrectly identified as a human or may result in a lengthy and undesirable delay (which can lead to the human terminating the call) when a human is incorrectly identified as an answering machine.

An improved AMD module may address one or more of these various shortcomings by providing a more accurate and faster determination of the type of call recipient, i.e., whether the call recipient is human or machine. The call center also may provide web-enabled customization tools (e.g., websites with easy-to-use GUIs) for the purpose of configuring the parameters for the AMD module associated with the client's voice site. This may enable the client to tailor the AMD module to the specific needs of the client's voice site/service.

Figure 1:
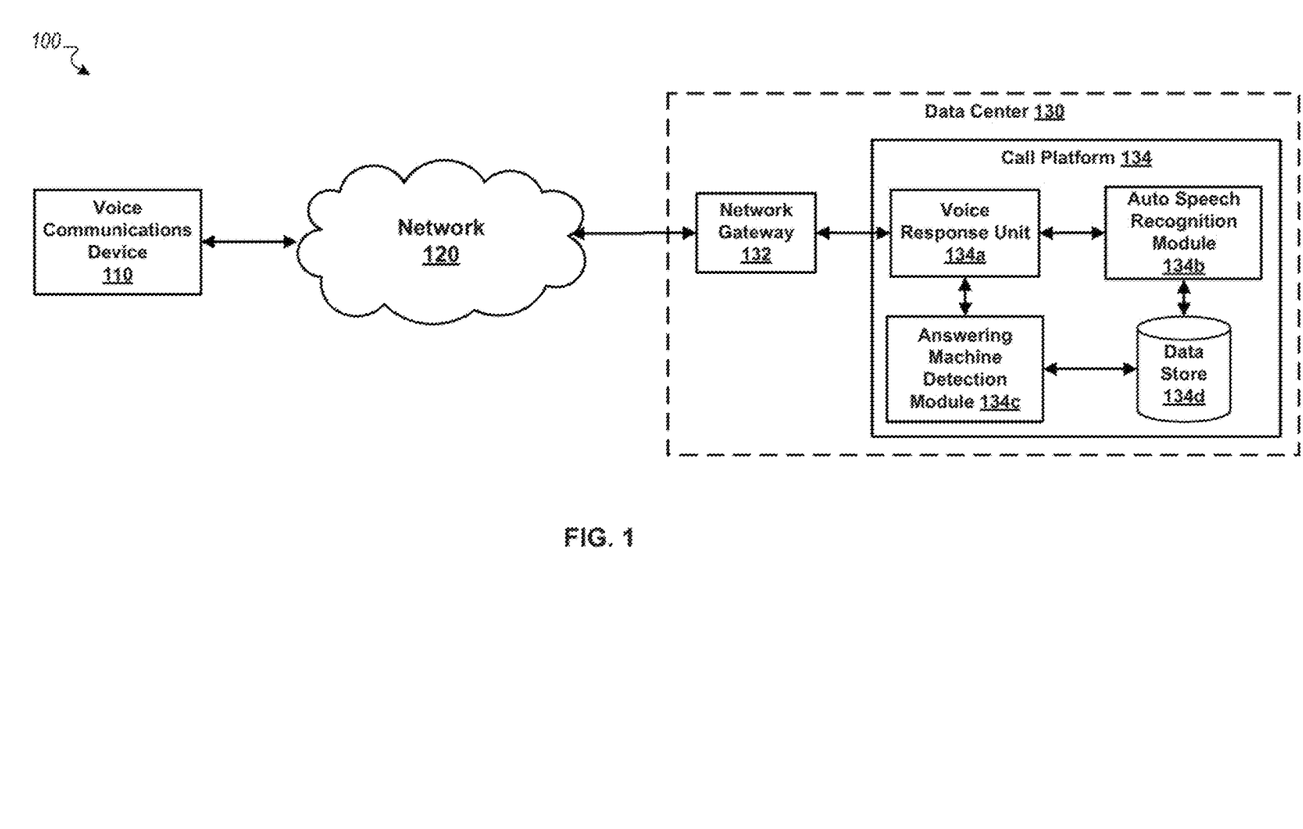
FIG. 1 illustrates an example of a voice communications system that implements an improved AMD module.

FIG. 1 illustrates an example of a voice communications system 100 that implements an improved AMD module. Voice communications system 100 includes a voice communications device 110 connected to a network 120 that is, in turn, connected to a data center 130. The data center 130 includes a network gateway 132 and a call platform 134. The call platform 134 includes several modules, such as the voice response unit (VRU) 134a, the auto speech recognition (ASR) module 134b, the answering machine detection (AMD) module 134c and the data store 134d.

The voice communications device 110 is an electronic device configured with hardware and software that enables the device to interface with a user and run hardware and software applications to perform various processing tasks. The voice communications device 110 is enabled to support voice functionality such as processing user speech and voice commands, and performing text-to-speech conversions. For example, the voice communications device 110 may be a telephone, a cell phone, a voice-enabled personal digital assistant (PDA), a voice-enabled tablet computer, a voice-enabled notebook or laptop computer, a voice-enabled desktop computer or any other appropriate portable or stationary computing device. The voice communications device 110 includes one or more processors configured to execute instructions stored by a computer readable medium for performing various client operations, such as input/output, communication, data processing, and the like.

The network 120 may include a circuit-switched voice or data network, a packet-switched voice or data network, or any other network able to carry voice and/or data, for example, Internet Protocol (IP)-based or asynchronous transfer mode (ATM)-based networks, including wired or wireless networks. The network 120 may be configured to handle voice traffic, for example, Voice over IP (VOIP) network. The network 120 also may be configured to handle web traffic such as hypertext transfer protocol (HTTP) traffic and hypertext markup language (HTML) traffic. The network 120 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The data center 130 includes a network gateway 132 that is coupled to the call platform 134, e.g., through a VoIP network connection or a data network. The network gateway 132 may be a server computer, a desktop computer, or some other suitable device, that receives user calls from or places calls to communications devices, e.g., voice communications device 110, via the network 120 and forwards the calls to the call platform 134. The network gateway 132 also responds to the calls in accordance with instructions received from the call platform 134.

In the call platform 134, the voice response unit (VRU) module 134a is connected to an auto speech recognition (ASR) unit 134b and answering machine detection (AMD) module 134c. The data store 134d is accessible by the ASR 134b and the AMD 134c. In some implementations, the data store 134d may be a file system, while in other implementations the data store 134d may be a database.

The VRU 134a includes one or more processing devices, e.g., servers and/or computers, and instructions that are executed by the processing devices for handling calls with voice communications devices, e.g., voice communications device 110. The calls are forwarded through the network gateway 132 between the call platform 134 and the voice communications devices. The instructions executed by the VRU 134a processing devices may be stored in memory local to the VRU 134a, or the instructions may be stored in the data store 134d and accessed by the VRU 134a.

In some implementations, the VRU 134a processes calls in accordance with a voice program. The voice program may be accessed from local memory within the VRU 134a or from the call platform 134. In some implementations, the VRU 134a processes voice programs that are script-based voice applications. The voice program, therefore, may be a script written in a scripting language such as, for example, voice extensible markup language (VoiceXML) or speech application language tags (SALT).

In some implementations, the VRU 134a includes a voice application server and computer systems that interface and provide data to the voice application server. The VRU 134a may send voice application programs or scripts to the network gateway 132 for processing and may receive user responses in return. The user responses may be analyzed by the VRU 134a and new programs or scripts that correspond to the user responses may then be sent to the network gateway 132 for processing.

In some implementations, the VRU 134a may initiate an outbound call to voice communications device 110. When the outbound call is established, the VRU 134a determines, with the help of the AMD 134c, whether a call recipient answering the call is a human or an answering machine.

The ASR 134b includes one or more processing devices, e.g., servers and/or computers, and instructions that are executed by the processing devices for performing grammar matching for the calls that are handled by the VRU 134a. The instructions executed by the ASR 134b processing devices may be stored in memory local to the ASR 134b, or the instructions may be stored in the data store 134d and accessed by the ASR 134b.

In some implementations, voice data that is received as part of a call handled by the VRU 134a is forwarded to the ASR 134b. The voice data may be, for example, answers by the call recipient to questions that are asked by the VRU 134a based on the voice program. The ASR 134b has access to grammar for all possible answers for each question that might be asked by the VRU 134a. The grammar may be stored in the data store 134*d*, or it may be stored in memory local to the ASR 134*b*. The grammar also may be dynamically generated.

The ASR 134*b* analyzes the voice data received from the VRU 134*b* and attempts to match the voice data to the grammar that is known to the ASR 134*b*, and/or to grammar that is dynamically generated. The ASR 134*b* sends a grammar match for the voice data to the VRU 134*a* with a confidence interval. The confidence interval may indicate an extent of match between the voice data and the grammar that is sent to the VRU 134*a*.

The AMD 134*c* includes one or more processing devices, e.g., servers and/or computers, and instructions that are executed by the processing devices for detecting whether a call recipient is a human or an answering machine. The instructions executed by the processing devices associated with the AMD 134*c* may be stored in memory local to the AMD 134*c*, or the instructions may be stored in the data store 134*d* and accessed by the AMD 134*c*.

In one implementation, the VRU 134*a* may execute a VoiceXML script to place an outbound call to the voice communications device 110. When the outbound call is answered, the VRU 134*a* receives an indication that the call has been established. Along with the indication that the call has been established, the VRU 134*a* receives voice data generated by the call recipient who answered the call using the voice communications device 110. The voice data may be received by the call platform 134 through the network 120 and the network gateway 132.

The VRU 134*a* sends to the AMD 134*c* the first section of the voice data received from the call recipient. In one implementation, the VRU 134*a* may be prompted to call the AMD 134*c* based on instructions in the VoiceXML script that is running in the VRU 134*a*. For example, the VRU VoiceXML script may have an initial grammar tag that calls the AMD 134*c*. In addition to the voice data, the VRU 134*a* also may provide to the AMD 134*c* grammar tags with parameters. The grammar tags may be stored, for example, in the data store 134*d*, or they may be stored in the VRU 134*a*.

The AMD 134*c* processes the voice data received from the VRU 134*a* based on the grammar tags and/or instructions provided by the VRU 134*a*. Once the processing is complete, the AMD 134*c* may return a result to the VRU 134*a* indicating whether the voice data is generated by a human or an answering machine. For example, the output of the AMD 134*c* may be a binary value with one value (e.g., binary value "0") indicating that the call recipient is an answering machine, and the other value (e.g., binary value "1") indicating that the call recipient is human. The messages exchanged by the VRU 134*a*, the ASR 134*b* and the AMD 134*c* may be based on the Real Time Protocol (RTP) format. Alternatively, or in addition, the messages may be in Media Resource Control Protocol (MRCP) format.

In some implementations, the functionality provided by the call platform 134 may be configured by a user through the AMD module 134*c*. For example, the data center 130 may provide outbound calling services to multiple clients. Each client may be associated with a voice site (or, more generally, a voice service) that is used to provide outbound calling services to the users associated with the client. The voice sites may be hosted by the data center 130 and processed by the call platform 134. A client may configure his or her voice site to place automated outbound calls to voice communications device 110 using the VRU 134*a*. Each voice site may be associated with its own AMD module 134*c*. The client may configure the AMD module 134*c* and customize the AMD module tailored to the functionality provided by the client's voice site.

Figure 2:
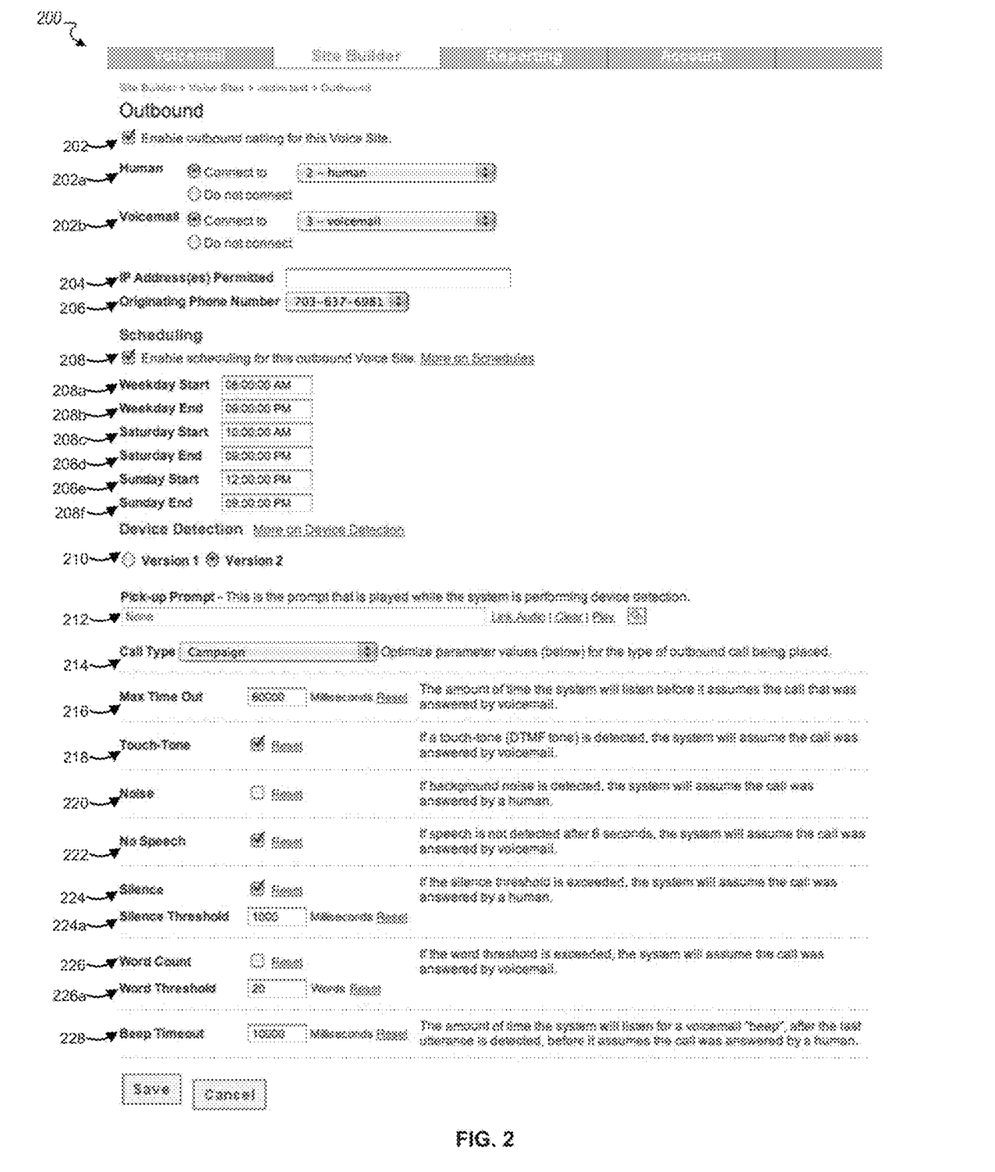
FIG. 2 illustrates an example of a graphical user interface (GUI) used to configure an AMD module.

FIG. 2 illustrates an example of a graphical user interface (GUI) 200 used to configure an AMD module. The GUI 200 provides a unified interface listing many or all of the parameters that may be used by the AMD module. The GUI 200 may be implemented, for example, as part of the data center 130. The following describes the GUI 200 as being implemented by components of the system 100. However, the GUI 200 may be implemented by other systems or system configurations.

The GUI 200 include a suite of options 202-228 that may be selected for configuring the AMD module. In one implementation, the GUI 200 will be provided on a website belonging to (e.g., hosted by or associated with) the data center 130. Clients of the data center 130 may have individual login accounts to access the GUI 200 on the website belonging to the data center 130.

A client may log in to the client's voice site account on the website belonging to the data center 130 and access the GUI 200 to configure the AMD 134*c* used by the client's voice site. The client will be able to configure whether to enable outbound calling for the client's voice site by checking option 202 on the GUI 200. If option 202 is checked, the client may further specify how the call platform 134 will handle a human call recipient 202*a* and an answering machine call recipient 202*b*. For example, the client may specify that if the call recipient 202*a* is human, then the call recipient be connected to a human operator. On the other hand, if the call is answered by an answering machine (voicemail 202*b*), the call would be connected to voicemail.

The client also may specify in field 204 the IP addresses of machines (e.g., client computer systems) owned by the client from which the representatives of the client will be allowed to access an application programming interface (API) for initiating the outbound calls. An "Originating Phone Number" option 206 on the GUI 200 enables the client to specify, for the outbound calls that are initiated, the originating phone number that will appear as caller identification information on the voice communications device 110 belonging to the call recipient.

The client may select a "Scheduling" option 208 on the GUI 200. If the client selects option 208, then the outbound calls can be placed by the call platform used by the client on the time periods specified by the client using the fields 208*a* through 208*f*. However, if the scheduling option 208 is not selected by the client, then outbound calls can be placed at any time. The latter may be the case, for example, when the client is a security services provider who may need to send alert messages to subscribed users at any time of the day or night.

A "Device Detection" option 210 is selectable to allow the client to choose whether to use the AMD module 134*c* (by selecting "Version 2" radio button in option 210), or a previous version that is indicated by the "Version 1" radio button. In one implementation, the previous version is a version of the AMD module that uses a different answering machine detection algorithm to determine whether the call recipient for outbound calls is human or an answering machine.

When the VRU 134*a* receives an indication that an outbound call has been answered, the VRU 134*a* may play a message to the call recipient while the AMD module 134*c* is in the process of determining whether the call recipient is a human or an answering machine. The message played to the call recipient may be selected by the client using a "Pick-up Prompt" 212 option on the GUI 200. For example, the client may decide to play an audio stream that is stored in an audio file in the data store 134*d*. The audio file may be selected by the client using a "Link Audio" link associated with option 212.

A "Call Type" 214 option on the GUI 200 enables the client to select predetermined values for the parameters 216-228 used by the AMD 134*c*, based on the type of outbound calls that may be placed by the client's voice site. In one implementation, the predetermined values may be optimal values that have been previously determined by the data center 130 for specific types of the outbound calls, and provided to the clients as options to facilitate the clients' configuration of the AMD 134*c*.

In one implementation, the data center 130 provides three different call types—a campaign call type, a notification call type and an autodialer call type. The campaign call type is used when general settings are to be applied to the client voice site for outbound calls.

The values of the parameters 216-228 that may be used by the AMD for the campaign call type are shown in the GUI 200. The campaign call type may be used when general settings are to be applied to the client voice site for outbound calls. Accordingly, the campaign call type provides predetermined values for a general setting of the AMD parameters 216-228.

"Max Time Out" 216 indicates the maximum amount of time that the AMD may listen to voice data in order to make a determination on the type of the call recipient. In one implementation, the detection duration used by the AMD may not be longer than the time specified by option 216, irrespective of the values of the other parameters. If the AMD cannot make a determination regarding the type of the call recipient after listening for a time interval equal to that specified by option 216, then the AMD concludes that the call recipient is an answering machine. The AMD sends this determination to the VRU, which may then connect the call recipient to an automated message recorded by the client.

If the client selects a "Touch Tone" parameter 218, then if the AMD detects a DTMF (dual tone multi-frequency) signal received in the voice data, the AMD will determine that the call recipient is an answering machine. In such an event, even if the call recipient is human, if the call recipient pressed a DTMF button on the voice communications device 110 during detection by the AMD, the call recipient will be treated as an answering machine and the VRU may, for example, play an automated message recorded by the client.

If the "Noise" parameter 220 is selected by the client, then if the AMD detects noise in the first few voice frames analyzed by the AMD, the AMD will determine that the call recipient is human and send this determination to the VRU. Upon receiving this determination from the AMD, the VRU may, for example, connect the call recipient to a human agent who is employed by the client to answer human call recipients. In one implementation, the first few voice frames may correspond to the sound that is generated between the initial call answer by the call recipient and, if the call recipient is a human, the positioning of the voice communications device 110 in a physical configuration that enables the human to use the voice communications device 110 to answer the call (e.g., positioning the voice communications device 110 to the human's ear). The human act of physically positioning the voice communications device 110 to enable the human call recipient to answer the call may result in noise that can be detected and used to distinguish a human call recipient from an answering machine call recipient, which may not exhibit such noise in answering the call.

The "No Speech" parameter 222 may be used in parallel with the "Noise" parameter 220. If the "No Speech" parameter 222 is selected, the AMD starts a timer from the moment the first segments of voice data is received from the VRU. If no speech (which may be human speech or noise) is detected in the voice data within a predetermined time interval as counted by the timer, then the AMD determines that the call recipient is an answering machine and informs the VRU accordingly. The VRU may then, for example, play to the call recipient an automated message recorded by the client. The predetermined time interval counted by the timer may be on the order of a few seconds. For example, in one implementation the predetermined time interval may be 6 seconds.

The "Silence" parameter 224 is used in conjunction with the "Silence Threshold" parameter 224*a*. If the "Silence" parameter 224 is selected by the client, the AMD measures the time elapsed due to a silence from the moment the last word was spoken by the call recipient. If the time elapsed exceeds the value specified by the client in the "Silence Threshold" parameter 224*a*, the AMD determines that the call recipient is human and informs the VRU accordingly.

The "Word Count" parameter 226 is used in conjunction with the "Word Threshold" parameter 226*a*. If the "Word Count" parameter 226 is selected by the client, the AMD counts the number of words spoken in the voice data that is analyzed by the AMD. If the total number of words counted by the AMD reaches and/or exceeds the value specified by the client in the "Word Threshold" parameter 226*a*, the AMD determines that the call recipient is an answering machine and informs the VRU accordingly.

The "Beep" timeout parameter 228 may be used to improve the system behavior once the AMD has determined the type of the call recipient. In one implementation, the "Beep" timeout parameter 228 is used with the notification call type.

The AMD may determine, based on other parameters, that the call recipient is an answering machine. Upon such a determination, the AMD will listen for an audio sound corresponding to an answering machine "beep" (which is used by the answering machine to indicate the start of voice message recording) for a period of time equal to the value specified by the client in the beep parameter 228. The AMD will inform the VRU of its determination either when it hears the beep or when the "Beep" timeout is reached, which ever occurs earlier. The "Beep" timeout parameter 228 may improve the system behavior by preventing voice messages that are recorded by the system on the answering machine from being partially not recorded as a result of the playing of the voice message by the system not being synchronized with the answering machine recording operation.

Therefore, the AMD module 134*c* implemented by the communications system 100 may be configured using the GUI 200. The range of customization options provided by the GUI 200 enables the communications system 100 to implement the AMD module 134*c* using state of the art techniques. This may provide high accuracy in determining the type of the call recipient.

As described previously, while configuring the AMD module, the client may specify or upload an audio file that is to be used as a greeting prompt when outbound calls are made to voice communications devices. When the outbound calls are answered, the call recipients hear the greeting prompt. The AMD module may be configured such that the greeting prompt is stopped when the call recipient (e.g., a human or an answering machine) starts speaking. The AMD module may return a detection result indicating the type of the call recipient prior to, contemporaneous with, or subsequent to the call recipient stopping to speak. This may allow the clients to provide the call recipients with a better calling experience. For example, when using the autodialer call type, the call recipients may not even notice the existence of an autodialer system.

The call center 130 may provide different parameter sets for the different call types. In one implementation, the parameters are tuned carefully by training based on recorded data from real world calls. However, for some voice sites, the parameters may not be suitable due to the variations in the speech habits of targeted call recipients (e.g., the voice frequency, speed, and patience of young people may differ from that of the elderly). For such voice sites, the ability to configure the AMD module may provide the clients with an efficient way to customize parameters for the target call recipients, and thereby provide the target call recipients with an enhanced calling experience.

Figure 3:
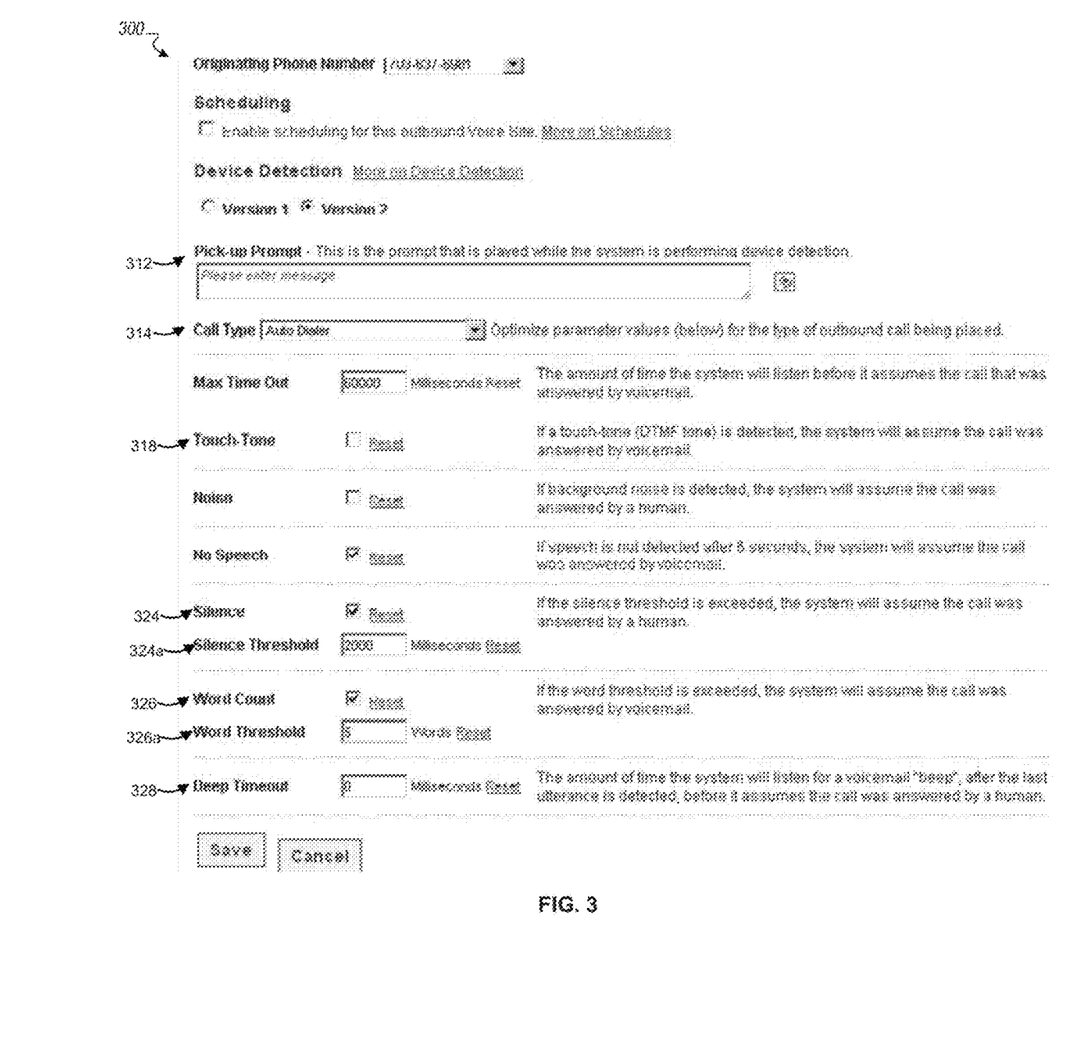
FIG. 3 illustrates an example of the GUI used to configure the AMD module for the autodialer call type.

FIG. 3 illustrates an example of the GUI 300 used to configure the AMD module for the autodialer call type. The GUI 300 may be implemented as part of the data center 130. The following describes the GUI 300 as being implemented by components of the system 100. However, the GUI 300 may be implemented by other systems or system configurations.

The autodialer call type is associated with the autodialer service that is provided by the data center 130. The autodialer service is configured to dial telephone numbers automatically to communicate between any two voice communications devices through the network 120. Once the connection has been established between the callee device and the call platform 134 running the autodialer service, the call platform 134 will announce the called party, and connect the callee device with the caller device.

The autodialer call type may be used to enable the AMD to determine quickly whether the call recipient is human. This may be useful, for example, to connect a human agent quickly to the call recipient if a human answers the outbound call, such that the human call recipient does not experience a prolonged silence period when he or she answers the call. The silence period may correspond to the time taken by the AMD module to determine whether the call recipient is a human or a machine.

The various fields in the GUI 300 are similar to the fields in the GUI 200, except as noted below. The "Pick-up Prompt" option 312 in GUI 300 shows a text field that may be used by the client to enter a text message. The VRU plays the text message to the call recipient when the outbound call is answered. The "Pick-up Prompt" option 312 may be used as an alternative to the "Pick-up Prompt" option 212 in GUI 200. In one implementation, at a given time the client is allowed to select one of the two options 212 and 312, but not both.

The "Call Type" option 314 in GUI 300 may be set to "Autodialer", while the "Call Type" option 214 in GUI 200 is set to "Campaign." The predetermined values for the various parameters used to configure the AMD for the autodialer call type are similar to the predetermined values used in the campaign call type shown in GUI 200, except as noted below.

The "Touch-Tone" parameter 318 is not selected in the autodialer call type, but it may be selected in the campaign call type, the latter as shown by option 218 in GUI 200. Similar to the "Silence" parameter 224 in campaign call type GUI 200, the "Silence" parameter 324 in GUI 300 may be used in conjunction with the "Silence Threshold" 324*a*. The predetermined value of "Silence Threshold" 324*a* for the autodialer call type is set to 2000, while the value of "Silence Threshold" 224*a* for the campaign call type is set to 1000. Therefore, for the autodialer call type, the AMD may wait for a longer time interval of silence compared to the campaign call type, before determining that the call recipient is human and accordingly informing the VRU.

The "Word Count" parameter 326 may be selected for the autodialer call type and used in conjunction with the "Word Threshold" parameter 326*a*. If the "Word Count" parameter 326 is selected, the AMD determines whether the number of words spoken in the voice data reaches and/or exceeds the value specified in the "Word Threshold" parameter 326*a*. If a positive determination is made, the AMD determines that the call recipient is an answering machine.

In one implementation, the value for "Word Threshold" 326*a* may be set to 5 for the autodialer call type. The value may be based on a determination that if a human answers a call, the human typically says only a few words (e.g., "Hello?") before going silent and waiting for a response from the caller. On the other hand, if an answering machine receives the outbound call, the answering machine may be configured to play a recorded greeting that includes a much greater number of words. Therefore, by analyzing the word count, the AMD may quickly determine the type of the call recipient. However, this approach may return false negatives in some cases (e.g., a talkative human answering the call and speaking a number of words that exceed the threshold). Therefore, for call types where an accurate determination may be important, the Word Count" parameter may be unselected. For example, the "Word Count" parameter 226 is not selected for the campaign call type.

The "Beep Timeout" parameter 328 may be unselected in the autodialer call type. This may be achieved, for example, by setting the value of "Beep Timeout" parameter 328 to 0. This may be the case for the autodialer call type since a low or no beep timeout value may facilitate a quicker determination of the type of the call recipient.

Figure 4:
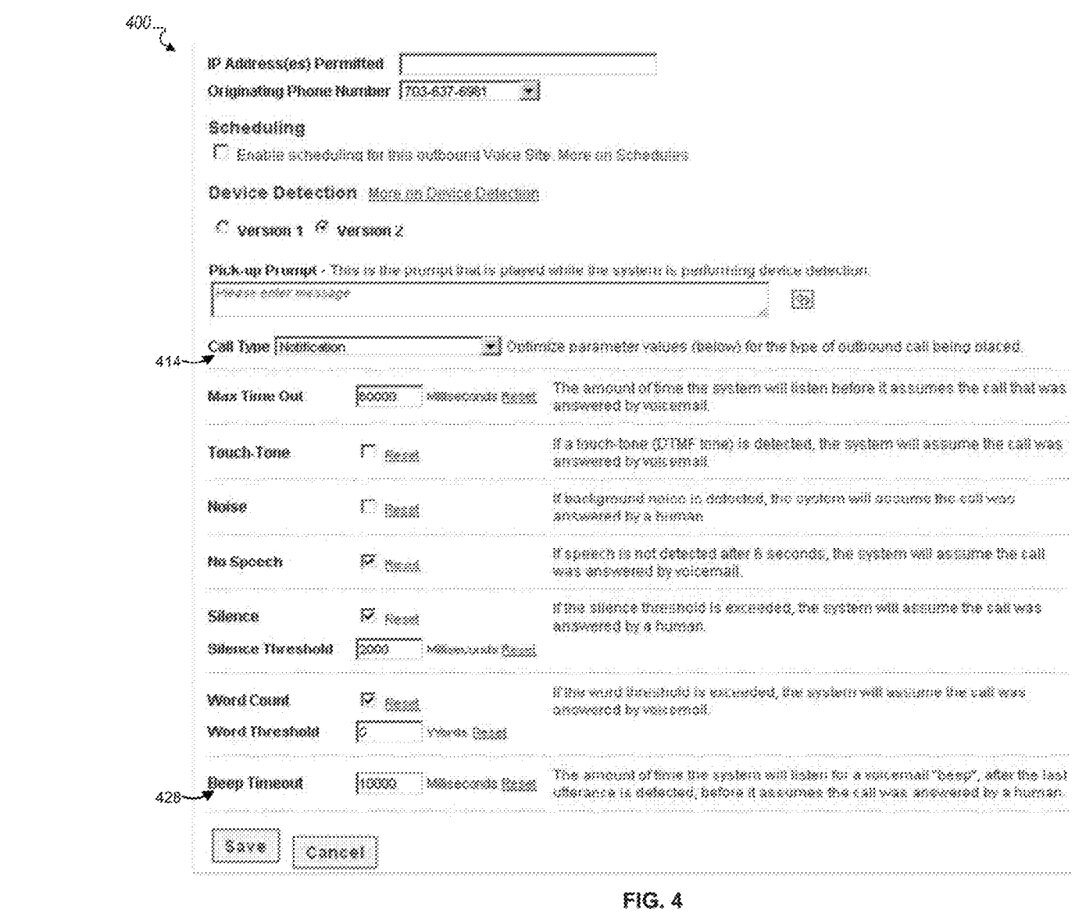
FIG. 4 illustrates an example of the GUI used to configure the AMD module for the notification call type.

FIG. 4 illustrates an example of the GUI 400 used to configure the AMD module for the notification call type. The GUI 400 may be implemented as part of the data center 130. The following describes the GUI 400 as being implemented by components of the system 100. However, the GUI 400 may be implemented by other systems or system configurations.

The notification call type is associated with the notification service that is provided by the data center 130. The notification service combines software and hardware to provide a means for delivering a pre-recorded message to a set of recipients by way of phone, email and/or text messages. For example, a doctor may use the notification service to send messages to patients by making phone calls. The pre-recorded messages may confirm medical appointments between the patients and the doctor. As another example, a voice site associated with a car manufacturer may use the notification call type to reach out to owners of a car model made by the car manufacturer. The pre-recorded message or notification may inform the owners of some safety information or recall issue.

The various fields in the GUI 400 are similar to the fields in GUI 200 or GUI 300, except as noted below. The "Call Type" option 414 in GUI 400 may be set to "Notification" so that the predetermined values for the various parameters used by the AMD are set to values that are suitable for the notification call type. For example, the "Beep Timeout" parameter 428 may be set to a value of 10000 milliseconds. This may provide the voice site with a sufficiently long wait interval before recording a message, which may be the pre-recorded notification. Therefore, the beep timeout interval may help to ensure that the pre-recorded notification, which may include important information, is properly recorded in the answering machine associated with the voice communications device 110.

Figure 5:
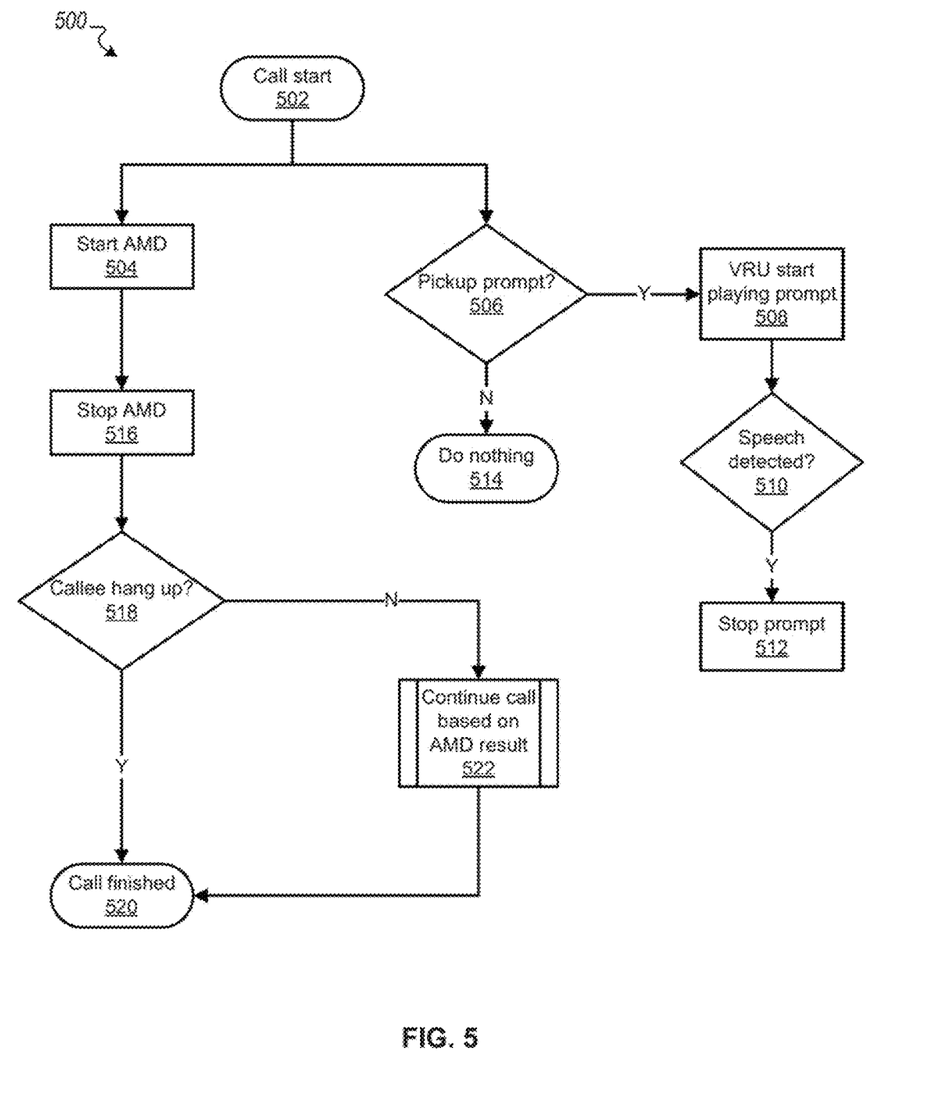
FIG. 5 is a flow chart illustrating an example of a process for implementing a voice response unit (VRU).

FIG. 5 is a flow chart illustrating an example of a process 500 for implementing a voice response unit (VRU). The process 500 may be implemented by one or more computer programs installed on one or more computers. The following describes process 500 as being performed by components of the voice communications system 100. However, the process 500 may be performed by other communications systems or system configurations.

The process 500 starts (502) when the VRU 134*a* receives an indication of an outbound call being answered and one or more voice frames being received by the VRU 134*a*. The outbound call may be placed by the call platform 134 to a voice communications device 110, and the call may be answered by a call recipient associated with the voice communications device 110.

In this context, a voice frame may represent a unit of audio data. A voice frame may include a header and a payload, with the latter being a voice packet. Alternatively, a voice frame may be a chunk of audio data that is captured for a predetermined period of time, e.g., for a certain number of milliseconds. The predetermined period of time may be the same for multiple voice frames, such that the sizes of the chunks are the same. Voice frames may be sent as part of an RTP stream.

Upon receiving the first few voice frames from the call recipient, the VRU 134*a* may access the AMD 134*c* module (504) and send it the initial voice data that is received by the VRU 134*a*.

In parallel with accessing the AMD 134*c*, the VRU 134*a* may check whether a pick up prompt is configured for the voice site (506). For example, the VRU 134*a* may check whether option 212 in GUI 200 specifies an audio file that is to be played. If a pick up prompt is configured, the VRU 134*a* starts playing the configured prompt (508). On the other hand, if a pick up prompt is not configured, the VRU 134*a* does not play any prompt (514).

While the pick-up prompt is playing, the VRU 134*a* checks the received voice data to determine if speech is detected (510), which may indicate that the call recipient is speaking. If speech is detected, the VRU 134*a* stops playing the prompt (512).

While the pick-up prompt is playing, or by the time the pickup prompt has completed playing, the AMD 134*c* may return a result to the VRU 134*a* with a determination of the type of the call recipient. In one implementation, on receiving the determination from the AMD 134*c*, the VRU 134*a* instructs the AMD 134*c* to stop processing data (516). However, in other implementations, the VRU 134*a* may let the AMD 134*c* to continue running (and may continue providing the AMD 134*c* with voice data for processing).

Subsequent to receiving the result from the AMD 134*c*, the VRU 134*a* checks whether the callee has hung up (518). If the VRU 134*a* determines that the callee has hung up, the call is finished (520) and VRU 134*a* terminates the connection. In other implementations, the VRU 134*a* is periodically monitoring for whether the callee has hung up and finishes the call/terminates the connection, irrespective of receipt of the result from the AMD 134*c*.

On the other hand, if the VRU 134*a* determines that the callee has not hung up, the VRU 134*a* continues the call based on the AMD result (522). For example, if the AMD 134*c* returned a result indicating that the call recipient is an answering machine, the VRU 134*a* may process call handling instructions specific to communication with an answering machine. For example, the VRU 134*a* may play an automated message that has been recorded by the client. However, if the AMD 134*c* returned a result indicating that the call recipient is a human, the VRU 134*a* may process call handling instructions specific to communication with a human. For example, the VRU 134*a* may connect the call recipient to a human agent who has been employed by the client to answer calls from human recipients.

Figure 6:
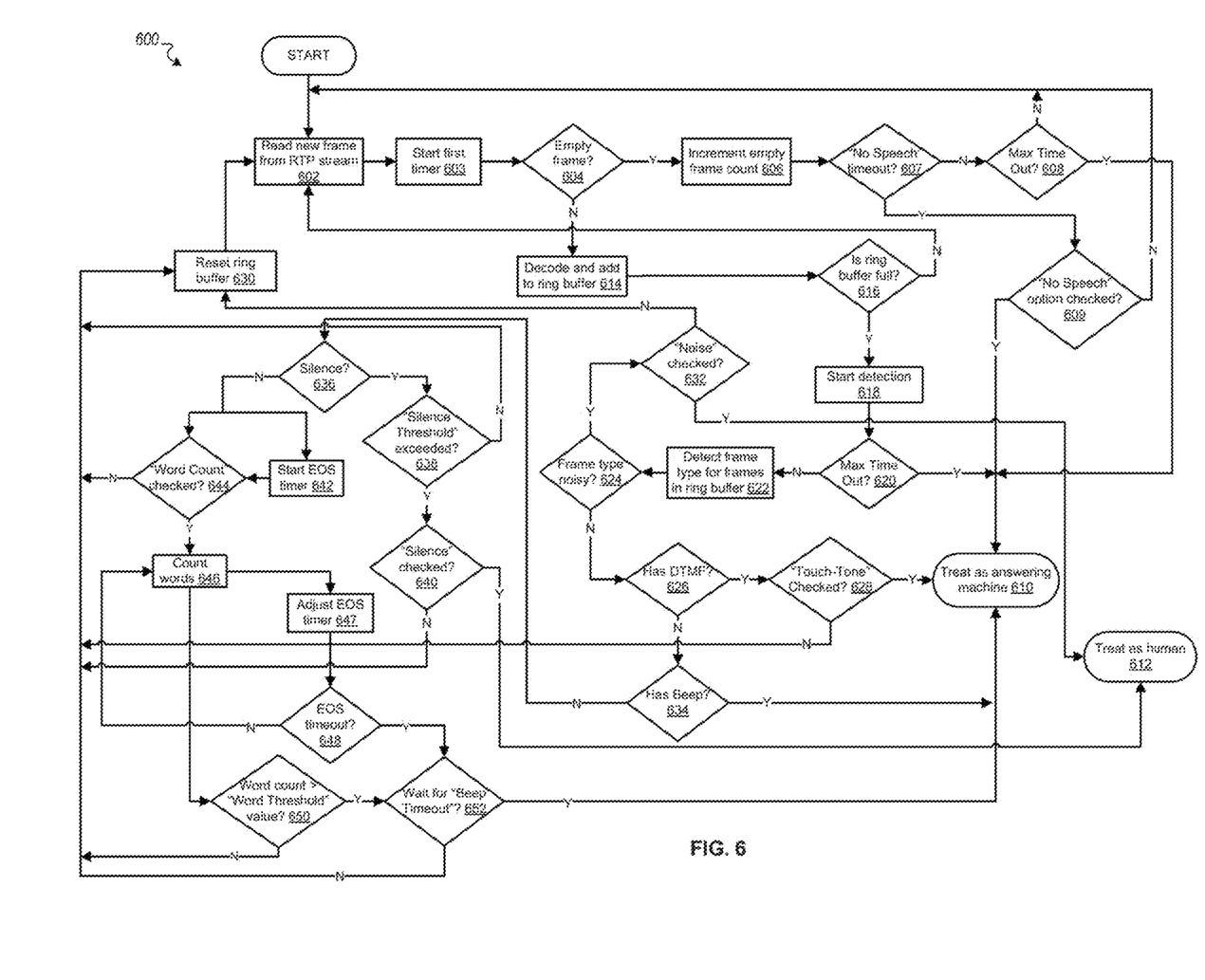
FIG. 6 is a flow chart illustrating an example of a process for implementing an AMD module.

FIG. 6 is a flow chart illustrating an example of a process 600 for implementing an AMD module. The process 600 may be implemented by one or more computer programs installed on one or more computers. The following describes process 600 as being performed by components of the voice communications system 100. However, the process 600 may be performed by other communications systems or system configurations.

The process 600 starts when the AMD 134*c* receives a new frame from an RTP stream (602). For example, an outbound call may be placed by the call platform 134 to a voice communications device 110, and the call may be answered by a call recipient associated with the voice communications device 110. The VRU 134*a* may receive indication that the outbound call has been answered and may receive one or more voice frames as part of an RTP stream over the established voice connection. The VRU 134*a* may forward one or more voice frames received in the RTP stream to the AMD 134*c*.

Upon receiving the one or more voice frames from the VRU 134*a*, AMD 134*c* starts a first timer (603). The first timer counts to the maximum time out value that may have been configured by the client, e.g., using option 216 in GUI 200.

The AMD 134*c* checks whether the frame is empty (604). If the AMD 134*c* determines that the frame is empty, e.g., if the frame includes no speech or other sound, AMD 134*c* increments the empty frame count (606). In one implementation, the frame may be detected as empty if the VRU 134*a* does not send any RTP packet to the AMD 134*c* in the frame.

The AMD 134*c* starts a second timer that counts from the time of call pickup to predetermined time interval for a no speech timeout. The second timer is started if no speech has been detected in the response from the time of call pickup. In one implementation, the predetermined time interval for the second timer is set to 6 seconds.

The AMD 134*c* checks whether time corresponding to the "No Speech" time out value has elapsed (607). If time corresponding to the "No Speech" time out value has not elapsed, or if speech has been detected since the time of call pickup such that the "No Speech" time out value is no longer relevant, AMD 134*c* checks whether time corresponding to the maximum time out value has elapsed (608). For example, AMD 134*c* measures the time counted by the first timer. If AMD 134*c* determines that the time counted by the first timer has reached the maximum time out value, i.e., maximum time out has occurred, then AMD 134*c* concludes that the call recipient is an answering machine (610) and returns the result to the VRU 134*a*. However, if maximum time out has not occurred, AMD 134*c* reads a new frame from the RTP stream (602).

On the other hand, if the AMD 134*c* determines that the "No Speech" time out has occurred (607), the AMD 134*c* checks whether the "No Speech" parameter is selected (609), e.g., using option 222 in GUI 200. If AMD 134*c* determines that the "No Speech" parameter is selected, then AMD 134*c* concludes that the call recipient is an answering machine (610) and returns the result to the VRU 134*a*. However, if "No Speech" parameter is not selected, AMD 134*c* reads a new frame from the RTP stream (602).

If the frame read from the RTP stream is not empty (604), AMD 134*c* decodes the frame and adds it to a ring buffer (614). In one implementation, the ring buffer may be a temporary memory storage that is internal to the AMD 134*c* module. In other implementations, the ring buffer may be memory storage that is external to the AMD 134*c*, e.g., the data store 134*d*.

The AMD 134*c* then checks whether the ring buffer is full (616). If the ring buffer is not full, AMD 134*c* reads a new frame from the RTP stream (602). However, if the ring buffer is full, AMD 134*c* starts detection (618) to decide whether the call recipient is an answering machine or a human.

When AMD 134*c* starts the detection, it first checks whether time corresponding to the maximum time out value has elapsed (620). For example, AMD 134*c* measures the time counted by the first timer. If AMD 134*c* determines that the time counted by the first timer has reached the maximum time out value, i.e., maximum time out has occurred, then AMD, then AMD 134*c* concludes that the call recipient is an answering machine (610) and returns the result to the VRU 134*a*.

However, if maximum time out has not occurred, the detection process continues and AMD 134*c* detects the frame type for the frames in the ring buffer (622). In one implementation, this is performed by the AMD 134*c* by examining the type of information included in the frames retrieved from the ring buffer.

Based on detecting the frame type, AMD 134*c* determines whether the frame type is noisy (624). The determination whether the frame type is noisy may be done, for example, by measuring the energy level corresponding to the frames in the ring buffer. For noisy frame types, the energy level will correspond to a certain range that will be different from the energy levels corresponding to frames that are not noisy.

If the AMD determines that the frame type is noisy, the AMD checks whether the "Noise" parameter is checked (632). This may be the case, for example, if the client has selected option 220 in GUI 200. If the "Noise" parameter is checked, AMD 134*c* concludes that the call recipient is a human (612) and returns the result to the VRU 134*a*. However, if the "Noise" parameter is not checked, AMD 134*c* resets the ring buffer (630) and proceeds to read a new frame from the RTP stream (602).

On the other hand, if AMD 134*c* determines that the frame type is not noisy, then the AMD 134*c* checks whether the frames include a DTMF signal (626). If the AMD determines that one or more frames include a DTMF signal, then the AMD determines whether the "Touch-Tone" parameter is checked (628). This may be the case, for example, if the client has selected option 218 in GUI 200. If the "Touch-Tone" parameter is checked, the AMD concludes that the call recipient is an answering machine (610) and returns the result to the VRU 134*a*. However, if the "Touch-Tone" parameter is not checked, AMD 134*c* resets the ring buffer (630) and proceeds to read a new frame from the RTP stream (602).

If the AMD 134*c* determines that the frames do not include a DTMF signal (626), then the AMD checks whether the frames include a beep (634). If the check returns a positive result, then the AMD concludes that the call recipient is an answering machine (610) and returns the result to the VRU 134*a*. However, if the check returns a negative result, the AMD proceeds to check whether the frames include silence (636), i.e., there is no sound content in the frames.

If the AMD 134*c* determines that the frames include silence, then the AMD determines whether time corresponding to the "Silence Threshold" value has elapsed (638). The "Silence Threshold" value may have been set, for example, by the client using parameter 224 in GUI 200.

If time corresponding to the "Silence Threshold" value has not elapsed, AMD 134*c* resets the ring buffer (630) and proceeds to read a new frame from the RTP stream (602). However, if time corresponding to the "Silence Threshold" value has elapsed, then the AMD determines whether the "Silence" parameter is checked (640). This may be the case, for example, if the client has selected option 224 in GUI 200. If the check returns a positive result, then the AMD 134*c* concludes that the call recipient is a human (612) and returns the result to the VRU 134*a*. However, if the check returns a negative result, AMD 134*c* resets the ring buffer (630) and proceeds to read a new frame from the RTP stream (602).

On the other hand, if AMD 134*c* determines that the frames do not include silence, the AMD launches an EOS (end of speech) timer (642) and determines whether the "Word Count" parameter is checked (644). This may be the case, for example, if the client has selected option 226 in GUI 200. If the "Word Count" parameter is not checked, AMD 134*c* resets the ring buffer (630) and proceeds to read a new frame from the RTP stream (602).

If the "Word Count" parameter is checked, AMD 134*c* counts the number of words it detects in the frames in the ring buffer (646). Every time the AMD detects a word in the frames, it adjusts the EOS timer (647) and resets it to count from the start. The EOS timer is used to count time corresponding to the value specified by the "Silence Threshold" parameter.

Along with counting the words detected in the frames, the AMD checks whether the EOS timeout has occurred (648). If the AMD determines that EOS timeout has occurred, then the AMD checks whether to wait for "Beep Timeout" (652). This may be the case, for example, if the client has set a non-zero value for option 228 in GUI 200.

If the AMD determines that it does not have to wait for "Beep Timeout", AMD 134*c* resets the ring buffer (630) and proceeds to read a new frame from the RTP stream (602). However, if the "Beep Timeout" value is non-zero, the AMD waits till a time interval corresponding to the "Beep Timeout" value has elapsed, or till the AMD has detected a beep in the voice data included in the frames, whichever is earlier. Then the AMD returns a result to the VRU 134*a* indicating that the AMD has determined that the call recipient is an answering machine (610).

If the "Word Count" parameter is checked (644), in addition to counting the number of words detected in the frames (646), the AMD 134*c* checks whether the word count is greater than the "Word Threshold" value (650). The "Word Threshold" value may have been set, for example, by the client using parameter 226*a* in GUI 200.

If the word count does not exceed the "Word Threshold" value, AMD 134*c* resets the ring buffer (630) and proceeds to read a new frame from the RTP stream (602). However, if the word count exceeds the "Word Threshold" value, then the AMD checks whether to wait for "Beep Timeout" (652). If the AMD does not have to wait for "Beep Timeout", AMD 134*c* resets the ring buffer (630) and proceeds to read a new frame from the RTP stream (602). However, if the "Beep Timeout" value is non-zero, the AMD waits till a time interval corresponding to the "Beep Timeout" value has elapsed, and then returns a result to the VRU 134*a* indicating that the AMD has determined that the call recipient is an answering machine (610).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, while many of the above implementations have focused on a call center/host system that uses a voice site architecture, other call center/host systems that do not employ such an architecture may also leverage the above-described techniques to improve answering machine detection. For example, rather than being provided/associated with particular voice sites, clients may instead be provided/associated with tailored or generic voice services that include an outbound calling component, where the outbound calling component of the service may leverage the disclosed answering machine detection techniques.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:

receiving, by a processor, a first value for a particular parameter for a first call type, and a second value for the particular parameter for a second call type different from the first call type, the second value differing from the first value, the first and second values being input via a graphical user interface;

identifying, by a processor, the first value received for the particular parameter for the first call type;

placing a first call of the first call type to a first communications device;

receiving a first response to the first call from a first call recipient associated with the first communications device;

determining, based on the first value received for the particular parameter, whether the first call recipient is at least one of a human or a machine;

handling the first call in a first manner in response to the first call recipient being determined to be a human;

handling the first call in a second manner that is different from the first manner in response to the first call recipient being determined to be a machine;

identifying, by the processor, the second value received for the particular parameter for the second call type different from the first call type, wherein the second value differs from the first value;

placing a second call of the second call type to a second communications device;

receiving a second response to the second call from a second call recipient associated with the second communications device;

determining, based on the second value received for the particular parameter, whether the second call recipient is at least one of a human or a machine;

handling the second call in the first manner in response to the second call recipient being determined to be a human; and handling the second call in the second manner that is different from the first manner in response to the second call recipient being determined to be a machine.

2. The method of claim 1, wherein the particular parameter includes a maximum time out parameter that indicates a maximum time allowed for processing the received first or second response before a determination is made that the first or second call recipient is a machine, and wherein determining whether the first or second call recipient is a human or a machine comprises determining that the first or second call recipient is a machine in response to the processing of the received first or second response failing to result in a determination that the first or second call recipient is a human or a machine prior to lapse of a time interval equal to the maximum time allowed.

3. The method of claim 1, wherein the particular parameter includes a touch tone parameter that indicates that detection of a dual-tone multi-frequency (DTMF) tone in the received first or second response results in determining that the first or second call recipient is a machine, and wherein determining whether the first or second call recipient is a human or a machine comprises determining that the first or second call recipient is a machine in response to detection of a DTMF tone in the received first or second response, based on the touch tone parameter being selected.

4. The method of claim 1, wherein the particular parameter includes a noise parameter that indicates that a detection of background noise in the received first or second response within a time window subsequent to call pickup and prior to initial detection of speech results in determining that the first or second call recipient is a human, and wherein determining whether the first or second call recipient is a human or a machine comprises determining that the call first or second recipient is a human in response to the detection of the background noise within the time window, based on the noise parameter being selected.

5. The method of claim 1, wherein the particular parameter includes a silence parameter that indicates that, subsequent to speech being initially detected in the received first or second response, detection of a silence in the received response having a duration longer than a predetermined threshold results in determining that the first or second call recipient is a human, and wherein determining whether the first or second call recipient is a human or a machine comprises determining that the first or second call recipient is a human in response to detecting the silence in the received first or second response subsequent to initial detection of speech in the received response, based on the silence parameter being selected.

6. The method of claim 1, wherein the particular parameter includes a beep time out parameter that indicates a maximum window of time during which monitoring the received first or second response for an audio beep sound will occur and during which time no message will be sent to the first or second call recipient, the maximum window of time beginning after detecting a last spoken word in the received first or second response and ending a predetermined time later, and wherein determining whether the first or second call recipient is a human or a machine comprises determining that the first or second call recipient is a machine in response to detecting an audio beep in the received response at a time subsequent to the detected last spoken word but prior to the predetermined time, based on the beep time out parameter being selected.

7. The method of claim 1, wherein the particular parameter includes a word count parameter that indicates that spoken words in the received first or second response will be counted and that, if a number of spoken words exceeds a predetermined threshold, a determination will be made that the first or second call recipient is a machine, and wherein determining whether the first or second call recipient is a human or a machine comprises determining that the first or second call recipient is a machine in response to the number of spoken words exceeding the predetermined threshold, based on the word count parameter being selected.

8. The method of claim 1, wherein the particular parameter includes a no speech parameter that indicates that, subsequent to the first or second call being answered, detection of no speech in the received first or second response having a duration longer than a predetermined threshold results in determining that the first or second call recipient is a machine, and wherein determining whether the first or second call recipient is a human or a machine comprises determining that the first or second call recipient is a machine in response to detecting no speech in the received first or second response subsequent to the first or second call being picked up, based on the no speech parameter being selected.

9. The method of claim 1, further comprising providing, by the processor, a graphical user interface for prompting a first or second user to configure the particular parameter.

10. The method of claim 9, wherein the graphical user interface is a web-enabled interface.

11. A system comprising:

one or more processors; and memory coupled to the one or more processors, the memory including instructions that, when executed by the one or more processors, cause the one or more processors to respectively:

receive a first value for a particular parameter for a first call type, and a second value for the particular parameter for a second call type different from the first call type, the second value differing from the first value, the first and second values being input via a graphical user interface;

identify the first value received for the particular parameter for the first call type;

place a first call of the first call type to the first communications device;

receive a first response to the first call from a first call recipient associated with the first communications device;

determine, based on the first value received for the particular parameter, whether the first call recipient is at least one of a human or a machine;

handle the first call in a first manner in response to the first call recipient being determined to be a human;

handle the first call in a second manner that is different from the first manner in response to the first call recipient being determined to be a machine;

identify the second value received for the particular parameter for a second call type different from the first call type, wherein the second value differs from the first value;

place a second call of the second call type to a second communications device;

receive a second response to the second call from a second call recipient associated with the second communications device;

determine, based on the second value received for the particular parameter, whether the second call recipient is at least one of a human or a machine;

handle the second call in the first manner in response to the second call recipient being determined to be a human; and handle the second call in the second manner that is different from the first manner in response to the second call recipient being determined to be a machine.

12. The system of claim 11, wherein the particular parameter includes a maximum time out parameter that indicates a maximum time allowed for processing the received first or second response before a determination is made that the first or second call recipient is a machine, and wherein the instructions that cause the one or more processors to determine whether the first or second call recipient is a human or a machine include instructions that cause the one or more processors to determine that the first or second call recipient is a machine in response to the processing of the received first or second response failing to result in a determination that the first or second call recipient is a human or a machine prior to lapse of a time interval equal to the maximum time allowed.

13. The system of claim 11, wherein the particular parameter includes a touch tone parameter that indicates that detection of a dual-tone multi-frequency (DTMF) tone in the received first or second response results in determining that the first or second call recipient is a machine, and wherein the instructions that cause the one or more processors to determine whether the first or second call recipient is a human or a machine include instructions that cause the one or more processors to determine that the first or second call recipient is a machine in response to detecting a DTMF tone in the received first or second response, based on the touch tone parameter being selected.

14. The system of claim 11, wherein the particular parameter includes a noise parameter that indicates that a detection of background noise in the received first or second response within a time window subsequent to call pickup and prior to initial detection of speech results in determining that the first or second call recipient is a human, and wherein the instructions that cause the one or more processors to determine whether the first or second call recipient is a human a machine include instructions that cause the one or more processors to perform operations comprising determining that the first or second call recipient is a human in response to the detection of the background noise within the time window, based on the noise parameter being selected.

15. The system of claim 11, wherein the particular parameter includes a silence parameter that indicates that, subsequent to speech being initially detected in the received first or second response, detection of a silence in the received response having a duration longer than a predetermined threshold results in determining that the first or second call recipient is a human, and wherein the instructions that cause the one or more processors to determine whether the first or second call recipient is a human or a machine include instructions that cause the one or more processors to determine that the first or second call recipient is a human in response to detecting the silence in the received first or second response subsequent to initial detection of speech in the received first or second response, based on the silence parameter being selected.

16. The system of claim 11, wherein the particular parameter includes a beep time out parameter that indicates a maximum window of time during which monitoring the received first or second response for an audio beep sound will occur and during which time no message will be sent to the first or second call recipient, the maximum window of time beginning after detecting a last spoken word in the received first or second response and ending a predetermined time later, and wherein the instructions that cause the one or more processors to determine whether the first or second call recipient is a human or a machine include instructions that cause the one or more processors to determine that the first or second call recipient is a machine in response to detecting an audio beep in the received first or second response at a time subsequent to the detected last spoken word but prior to the predetermined time, based on the beep time out parameter being selected.

17. The system of claim 11, wherein the particular parameter includes a word count parameter that indicates that spoken words in the received first or second response will be counted and that, if a number of spoken words exceeds a predetermined threshold, a determination will be made that the call recipient is a machine in response to the number of spoken words exceeding a predetermined threshold, and wherein the instructions that cause the one or more processors to determine whether the call recipient is a human or a machine include instructions that cause the one or more processors to determine that the call recipient is a machine in response to the number of spoken words exceeding the predetermined threshold, based on the word count parameter being selected.

18. The system of claim 11, wherein the particular parameter includes a no speech parameter that indicates that, subsequent to the call being answered, detection of no speech in the received first or second response having a duration longer than a predetermined threshold results in determining that the first or second call recipient is a machine, and wherein the instructions that cause the one or more processors to determine whether the first or second call recipient is a human or a machine include instructions that cause the one or more processors to determine that the call recipient is a machine in response to detecting no speech in the received first or second response subsequent to the call being picked up, based on the no speech parameter being selected.

19. The system of claim 11, wherein the instructions further cause the one or more processors to provide a graphical user interface for prompting a first or second user to configure the particular parameter.

20. The system of claim 19, wherein the graphical user interface is a web-enabled interface.

21. The method claim 1, wherein the first or second call type is selected from a group consisting of a campaign call type, notification call type, and an autodialer call type.

22. The system of claim 11, wherein the first or second call type is selected from a group consisting of a campaign call type, notification call type, and an autodialer call type.

* * * * *